Sept. 11, 1928.  
C. P. BROCKWAY  
1,683,602  
ENGINE COOLING SYSTEM  
Filed April 11, 1921  
3 Sheets-Sheet 1
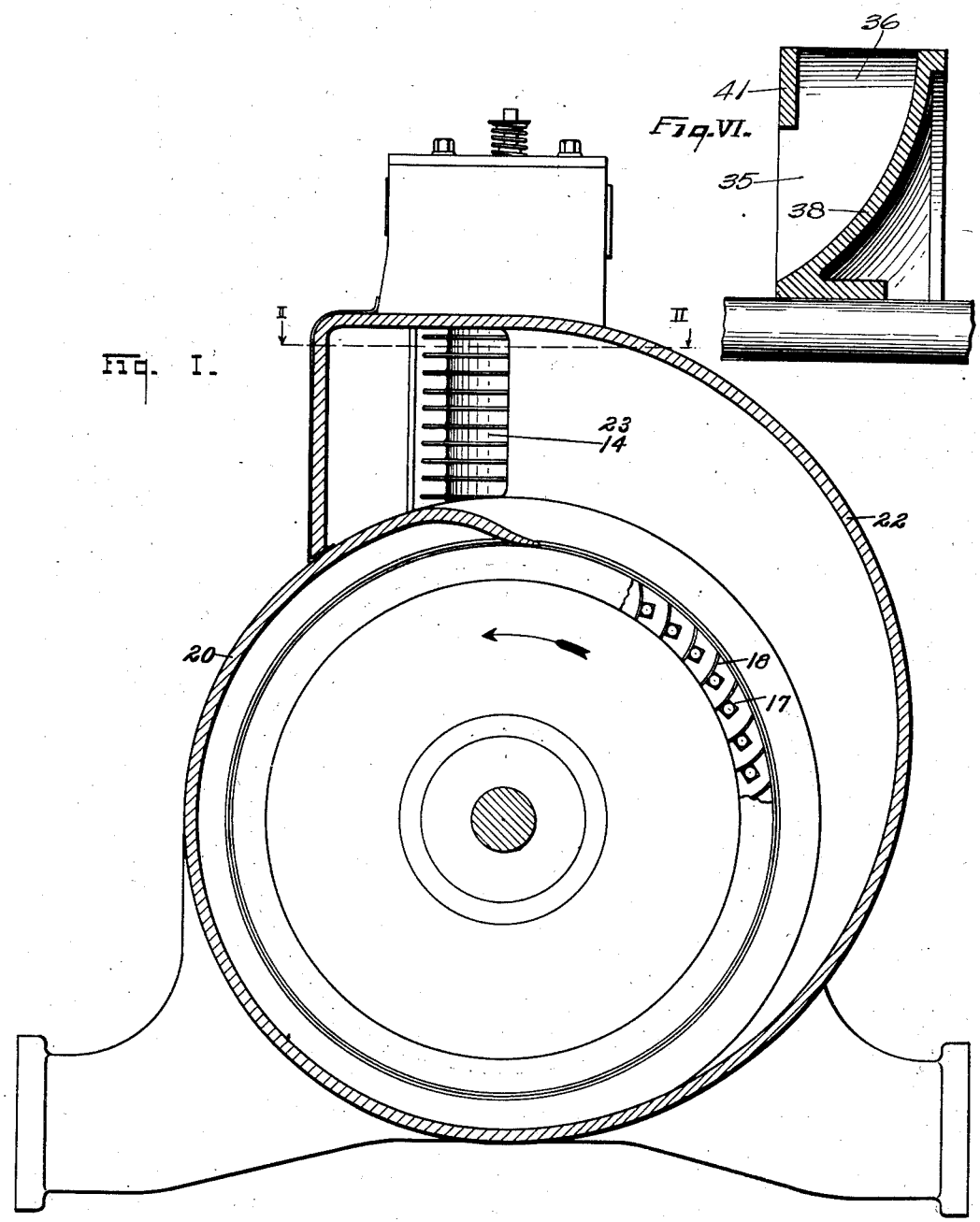
INVENTOR.  
*Carl P. Brockway*  
BY *Chester H Braselton*  
ATTORNEYS.

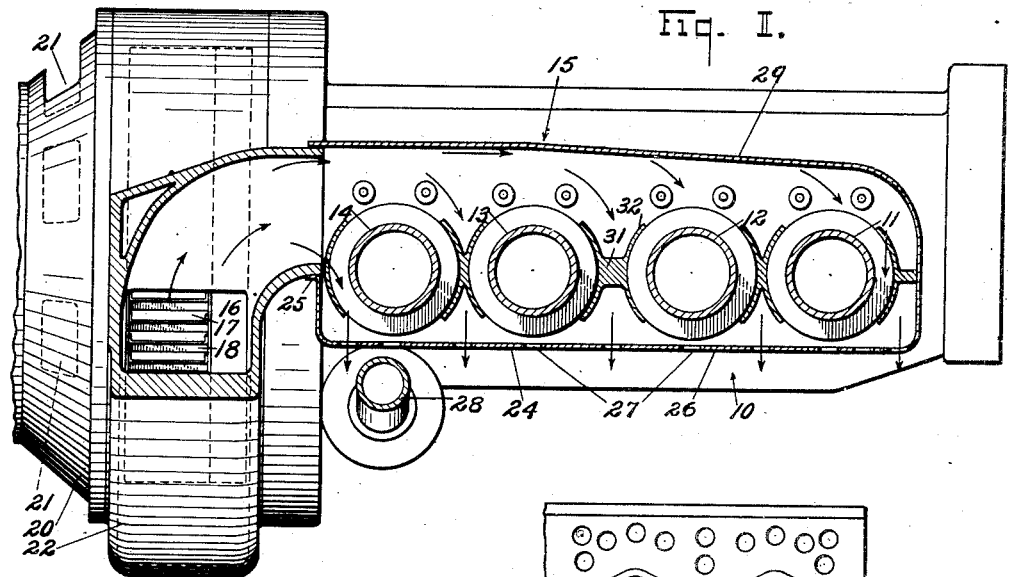
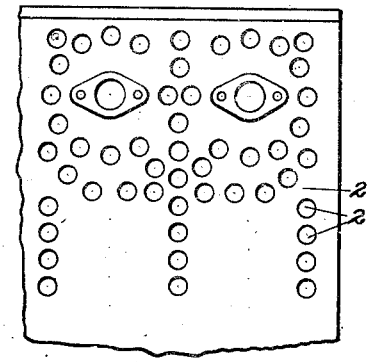
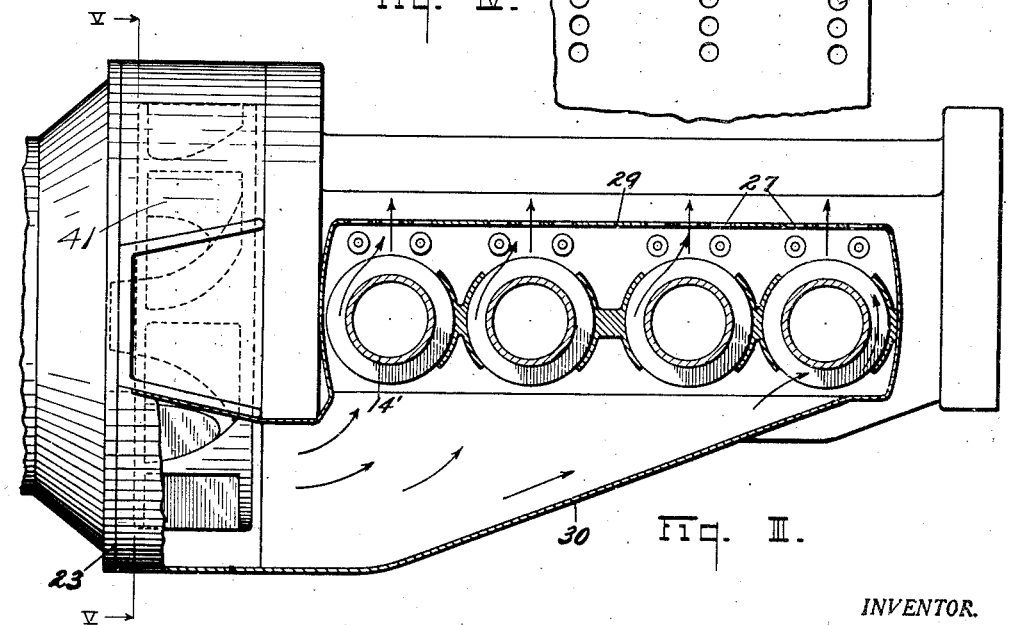

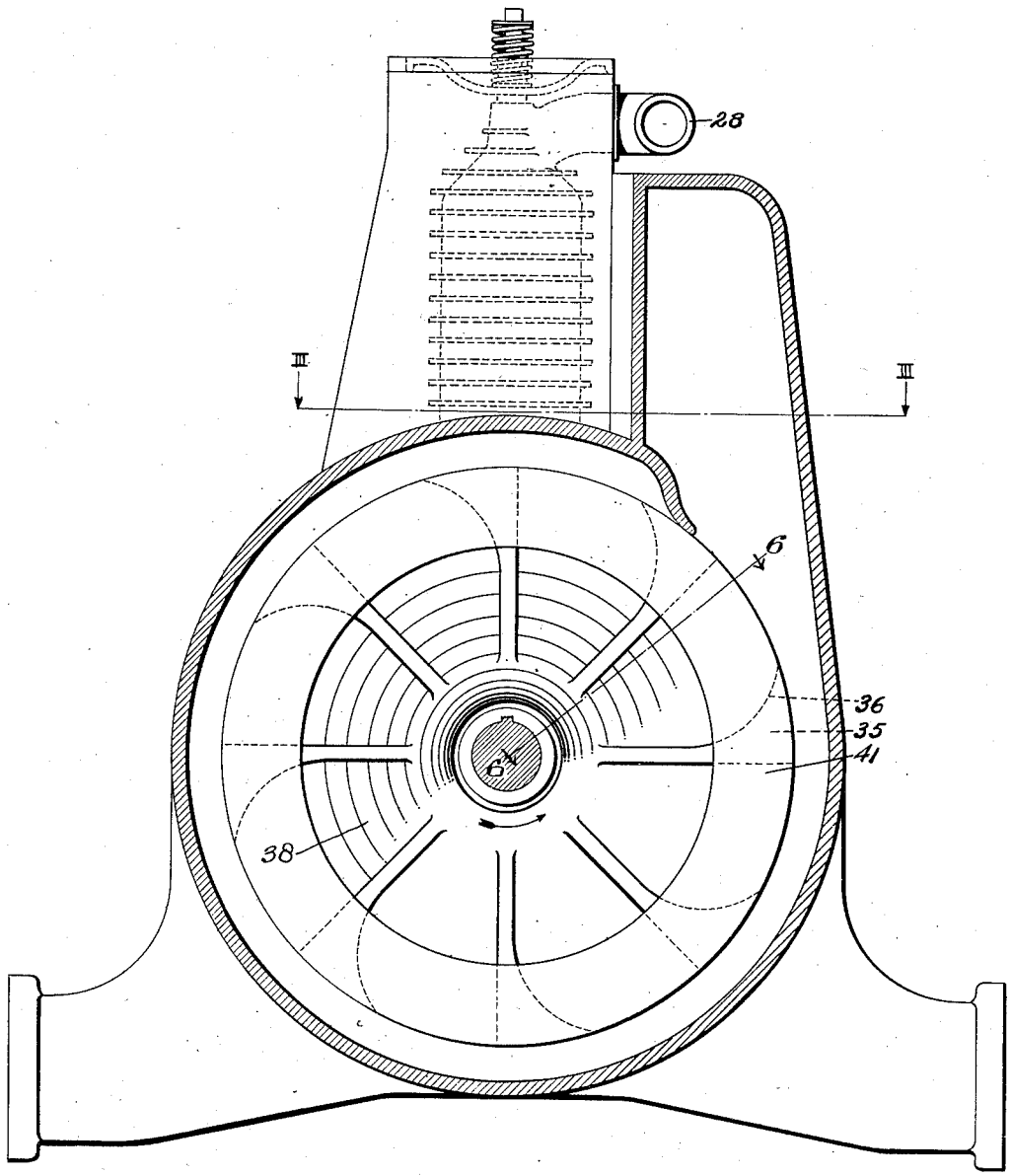

Patented Sept. 11, 1928.

1,683,602

UNITED STATES PATENT OFFICE.

CARL P. BROCKWAY, OF TOLEDO, OHIO, ASSIGNOR TO INDUSTRIAL RESEARCH CORPORATION, OF TOLEDO, OHIO, A CORPORATION OF DELAWARE.

ENGINE-COOLING SYSTEM.

Application filed April 11, 1921. Serial No. 460,566.

The present invention relates to a novel system of cooling an engine whereby a forced circulation of air is made around the engine, its cylinders, and the appurtenances thereof, in such a way and by such means as to greatly increase the efficiency in cooling the engine, wherein air may be forced, by power operated means, or by the movement of a vehicle upon which the engine is used, to pass transversely of the engine cylinder or cylinders rather than longitudinally up or down the surface of the cylinders. In this way travel of the air in contact with the heated surfaces is reduced and thereby a large increase in the volume of fresh cooling air passing the cylinders is caused thus operating to increase the rate of heat exchange and permitting for example, a more efficient arrangement of heat cooling fins for the cylinders, and having other advantages. The invention further has for its object a system of this character arranged to more equally cool the heated areas of a cylinder or plurality of cylinders and for equally cooling the several cylinders if more than one be used, the arrangement as a whole having been found to produce unexpected and important results in the air cooling of an engine, possibly by preventing a distortion of warping of any parts by reason of unequal heat dissipation heretofore unavoidable.

The present invention also has for its object a novel system of cooling as indicated, in which the circulation of the air is made to assist in cooling the exhaust of the cylinder and has a definite circulation with regard to the arrangement of cylinder and exhaust to produce what have been found to be highly advantageous results. The invention also includes a novel and simplified arrangement of casing for conducting the air in the required direction of circulation to obtain the results indicated, the shape of the same and the location of the forced means for obtaining circulation also being features of the invention.

The invention includes a novel method of cooling by which the results indicated above are obtained as well as the apparatus, arrangement of elements, and structure suggested.

Other objects and those relating to economies of manufacture will appear herein as I proceed with a detailed description of that particular embodiment of my invention which for the purposes of illustration I have shown in the accompanying drawings in which, Figure I is a transverse sectional view showing an embodiment of the invention;

Figure II is a plan view partly in section, of an engine with the said embodiment of the invention shown connected therewith;

Figure III is a plan view partly in section of a modification;

Figure IV represents a side elevation of the air outlet side of the casing for the two embodiments of the invention illustrated in Figures II and III;

Figure V is a transverse section of the modification of Figure III showing the outline of the fan wheel blades.

Figure VI is a sectional view taken on the line 6—6 of Fig. V.

For the purpose of illustrating the principle of the method and means constituting the present invention I have shown in Figures I and II an engine 10 including a plurality of cylinders 11, 12, 13, and 14, the engine being suitably mounted on a frame 15 in any desired manner. The fly-wheel 16 for the engine has connected thereto a fan or blower 17 of a type illustrated, consisting of a plurality of vanes 18, as shown in Figure I. The fly-wheel and fan are provided with a housing 20 having a plurality of circumferentially arranged openings 21 relatively near the head of the blower, whereby air may be drawn into the housing centrally of the fly-wheel fan to be discharged peripherally thereof. Associated with the fan housing and connected integrally therewith or formed separately and attached thereto, is an air receiving casing 22 shaped as shown in Figure I to provide a gradually increasing air clearance between the periphery of the fan 17 in order to form a chamber 23 and to efficiently receive the air forced thereinto. The casing 22 extends transversely of the fan housing 20 and across the rear of the cylinder 14 as will be apparent from an inspection of the drawings. Surrounding the several cylinders is a casing 24 forming an extension of the chamber 23 adapted to conduct the air longitudinally along the several cylinders. The casing 24 may be made of sheet metal if desired and extend across the front cylinder 11 and to the opposite side of the cylinders to completely encase and house the same. The casing 24 may be flanged as at 25 to facilitate connection with the engine casing or housing 22 for the flywheel. The casing 24 is arranged to gradually decrease the space between it and the cylinders as the same approaches the cylinders most remote from those adjacent the entrance of the air from the chamber 23. This will facilitate equal distribution of air for each of the several cylinders. On the exhaust side 26 of the casing 24 the casing is provided with a plurality of openings 27. It is apparent that this side of the casing might well be left open entirely but I am able to so arrange the outlet openings for the air as to have an important advantage of drawing the air forced through the casing upward around the head of the cylinder or hottest part thereof. This has an important function in connection with my improved system of cooling, in that it equally cools the entire cylinder as will be readily understood.

The exhaust pipe 28 for the engine cylinders in the embodiment of the invention illustrated in Figures I and II, is in the path of the exhaust of the air after it has passed the several cylinders, as shown in Fig. II.

In the embodiment of my invention illustrated in Figures III and V the exit ports 27 are on the side 29 of the casing 15 opposite to the exhaust pipe 28, see Fig. V, so that the air current moves from the fan directly against the exhaust ports and as the exhaust side of the cylinders are hottest and since the air is coolest just prior to contact with the exhaust portions the cooling effect is greatest at these points and an equable diminution of temperature secured for the whole cylinder.

Similarly as in the modification of Figure II the casing is formed so as to have a decreasing volume as the cylinder 11 is approached, the wall 30 being inclined from the fly-wheel toward the engine. In order to assist further the distribution of the air current use is made in both forms of the invention of guiding plates 31 between each cylinder for the purpose of forcing the transverse air currents into restricted passage ways close to the cylinders. This movement is also aided by means of wings 32 extending circumferentially about the cylinders for a limited distance and formed integral with the plates 31 so that the air in its movement is forced to pass between the ribs of the adjacent cylinders where the greatest cooling action may result.

In Figs. III, V, and VI, I have shown another form of combined fly wheel and fan which I have found to be very satisfactory. This fly wheel has a solid web, 38, which is curved rearwardly, that is, toward the engine, as it approaches the periphery of the wheel. The curvature of this web will be apparent from the section, Fig. VI. The wheel has a plurality of radially arranged ribs, 35, which form the blades of the fan. The rear faces of these ribs are substantially straight or radial, as seen in Fig. V, and the forward or leading faces, 36, of the blades are curved forwardly with a curvature which increases as the periphery of the wheel is approached. The forward edges of the blades lie in a single plane and these blades or ribs merge into the web 38, as they approach the center of the wheel, see Figs. V and VI. The width of the blades increases as the periphery of the wheel is approached, due to the curvature of the web 38, the wheel has the annular circumferential band 41, integral therewith and arranged in the plane of the forward edges of the ribs 35. This band 41, the web 38, and the forward and rear faces of the blades form curved channels through which air is discharged peripherally of the wheel.

In operation, air is drawn in at the central portion of the wheel, caught and directed centrifugally by the blades 35, and discharged through the channels at the periphery of the wheel. The blades, 35, and band 41, may be cast integral with the web 38, but I am not to be restricted to this construction. It will be observed that the ribs 35, increase in thickness toward the periphery giving the peripheral weight necessary for the wheel to function properly as a fly wheel.

While I have illustrated and described in more or less detail a certain embodiment of my invention I do not wish to be limited thereto, as various other modifications and arrangements will be obvious to those skilled in the art without departing from the scope of my invention. Therefore I desire to claim my invention broadly as well as specifically as indicated by the appended claims.

What I claim is:

1. Means for cooling an engine having a plurality of cylinders provided with heat dissipating fins, including a fan driven by the engine, a housing for said fan, said housing being provided with openings permitting air to be drawn therein centrally of said fan, a receiving chamber having a gradually increasing volume at a portion of the periphery of said fan to receive said air, and a casing surrounding said cylinders and forming a conduit for leading said air along one side of said plurality of cylinders and transversely of said cylinders, said casing being provided with outlet openings on the opposite side of said cylinders from said conduit and so arranged as to provide for a variation in the passage of air across said cylinders in order to equally cool the variably heated portions thereof.

2. Means for cooling an engine provided with plurality of cylinders, including an air forcing device, a discharge chamber for said air, and a casing for said cylinders gradually tapering from the intake end thereof to the other end of the engine to provide means for passing said air along one side of said cylinders and then transversely thereof past each cylinder equally, said casing extending from top to bottom of said cylinders, the side of the casing adjacent the top and opposite the tapered side of the casing being apertured to form outlets for the air currents.

3. Means for cooling an engine having a plurality of cylinders provided with heat dissipating fins, including an engine driven fan, a housing for said fan, said housing having a peripheral discharge for said fan, and a casing surrounding said cylinders and forming a conduit connecting with said discharge for leading the air along one side of said cylinders and then transversely and vertically thereof, said casing being provided with outlet openings on the opposite side of said cylinders from said conduit adjacent the top.

4. In an internal combustion engine, the combination of a plurality of cylinders having exhaust valves, a blower arranged at one end of said engine, and a casing surrounding said cylinders and having one side wall spaced from said cylinders to form an air conduit into which said blower discharges, said conduit extending along one side of the group of cylinders, and said casing being provided with air discharge openings upon the opposite side of said group of cylinders from said conduit adjacent the cylinder exhaust valves.

5. The combination with an internal combustion engine having a plurality of cylinders each provided with heat radiating fins disposed in planes perpendicular to the axes of said cylinders, of a blower driven by said engine, and a casing surrounding said cylinders and having one wall spaced therefrom to provide an air conduit into which said blower discharges and which extends along one side of said group of cylinders, the opposite wall of said casing being perforated adjacent the upper end of said fins to permit the discharge of air therefrom.

6. The combination with an internal combustion engine having a plurality of cylinders provided with heat radiating fins disposed in planes perpendicular to the axes of said cylinders, of a blower driven by said engine, and a casing surrounding said cylinders and having one wall spaced therefrom to form an air conduit, extending along one side of the group of cylinders and into which said blower discharges, said casing being provided with air discharge openings on the opposite side of said group of cylinders from said conduit, and curved baffle plates interposed between the cylinders of said group and extending partially around the same to direct the air from said conduit into close proximity to the cylinder walls and between said fins.

7. In an air cooling system for gas engines having a plurality of cylinders with exhaust ports; the combination of an air propeller; an air conduit between said air propeller and the engine; an air discharge casing surrounding said engine on one side thereof and provided with a plurality of openings on the opposite side thereof with a greater number of openings adjacent said exhaust ports; and means for guiding cooling air between the several cylinders toward said openings in said casing.

In testimony whereof, I affix my signature.

CARL P. BROCKWAY.